(12) United States Patent
Quach et al.

(10) Patent No.: US 10,731,477 B2
(45) Date of Patent: Aug. 4, 2020

(54) WOVEN SKIN CORES FOR TURBINE AIRFOILS

(71) Applicant: United Technologies Corporation, Farmington, CT (US)

(72) Inventors: San Quach, Southington, CT (US); Jeffrey T. Morton, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 172 days.

(21) Appl. No.: 15/700,990

(22) Filed: Sep. 11, 2017

(65) Prior Publication Data

US 2019/0078445 A1 Mar. 14, 2019

(51) Int. Cl.
*F01D 5/18* (2006.01)

(52) U.S. Cl.
CPC .............. *F01D 5/188* (2013.01); *F01D 5/187* (2013.01); *F05D 2250/37* (2013.01); *F05D 2260/202* (2013.01); *F05D 2260/22141* (2013.01); *F05D 2260/231* (2013.01)

(58) Field of Classification Search
CPC ...... F01D 5/188; F01D 5/187; F05D 2250/37; F05D 2260/202; F05D 2260/22141; F05D 2260/231
USPC ........................................................ 416/96 R
See application file for complete search history.

(56) References Cited

U.S. PATENT DOCUMENTS

| | | | |
|---|---|---|---|
| 7,563,072 B1* | 7/2009 | Liang | F01D 5/187 415/115 |
| 7,686,582 B2 | 3/2010 | Cunha | |
| 7,740,445 B1* | 6/2010 | Liang | F01D 5/187 415/173.5 |
| 7,775,768 B2* | 8/2010 | Devore | F01D 5/187 416/97 R |
| 8,182,221 B1* | 5/2012 | Liang | F01D 5/087 415/115 |
| 8,366,394 B1* | 2/2013 | Liang | F01D 5/187 415/115 |
| 9,115,590 B2* | 8/2015 | Spangler | F01D 5/18 |
| 9,551,228 B2* | 1/2017 | Propheter-Hinckley | F01D 5/187 |
| 2002/0021966 A1* | 2/2002 | Kvasnak | F01D 5/187 416/97 R |

(Continued)

OTHER PUBLICATIONS

European Search Report from the European Patent Office for EP Application No. 18193609.7 dated Feb. 11, 2019, 9 pages.

(Continued)

*Primary Examiner* — Hung Q Nguyen
*Assistant Examiner* — Susan E Scharpf
(74) *Attorney, Agent, or Firm* — Cantor Colburn LLP

(57) ABSTRACT

An airfoil includes an airfoil body having a pressure side and a suction side that each radially extend between a first radial boundary end and a second radial boundary end and each axially extend between a leading edge and a trailing edge. The airfoil body defines a plurality of first skin core passages disposed proximate the suction side and radially extend from the first radial boundary end towards the second radial boundary end, and a plurality of second skin core passages that radially extend toward the second radial boundary end and circumferentially extend towards the suction side proximate the second radial boundary end.

20 Claims, 4 Drawing Sheets

(56) References Cited

U.S. PATENT DOCUMENTS

| | | | |
|---|---|---|---|
| 2006/0096092 A1* | 5/2006 | Pietraszkiewicz | F01D 5/147 29/889.721 |
| 2009/0175733 A1* | 7/2009 | Poon | B22C 9/10 416/97 R |
| 2011/0123311 A1* | 5/2011 | Devore | F01D 5/187 415/115 |
| 2017/0081958 A1 | 3/2017 | Xu et al. | |

OTHER PUBLICATIONS

European Office Action; Application No. 18193609.7; dated Apr. 29, 2020; 4 pages.

* cited by examiner

WOVEN SKIN CORES FOR TURBINE AIRFOILS

BACKGROUND

Illustrative embodiments pertain to the art of turbomachinery, and more specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The turbine section is provided with turbine airfoils that are shaped to generate lift for conversion to rotational energy in the turbine. The turbine airfoils operate in a hot environment and may experience thermal mechanical fatigue, creep, and other temperature-related stresses. A cooling flow is utilized to flow through some portions of the turbine airfoil to maintain durability; however the cooling flow may result in reduced engine performance.

Accordingly, it is desirable to provide cooling flow to the turbine airfoil while minimizing an impact on engine performance.

BRIEF DESCRIPTION

In one illustrative embodiment, an airfoil for a gas turbine engine is provided. The airfoil includes an airfoil body having a pressure side and a suction side that each radially extend between a first radial boundary end and a second radial boundary end and each axially extend between a leading edge and a trailing edge. The airfoil body defines a plurality of first skin core passages disposed proximate the suction side and radially extend from the first radial boundary end towards the second radial boundary end, and a plurality of second skin core passages that radially extend toward the second radial boundary end and circumferentially extend towards the suction side proximate the second radial boundary end.

In addition to one or more of the features described herein, proximate the second radial boundary end, a first skin core passage of the plurality of first skin core passages is axially disposed between a first and second skin core passage of the plurality of second skin core passages.

In addition to one or more of the features described herein, the airfoil body defines a first skin core inlet passage that is disposed proximate the first radial boundary end and the suction side and the plurality of first skin core passages extend from the first skin core inlet passage.

In addition to one or more of the features described herein, the airfoil body defines a second skin core inlet passage that is disposed proximate the first radial boundary end and is circumferentially disposed between the first skin core inlet passage and the pressure side.

In addition to one or more of the features described herein, the plurality of second skin core passages extend from the second skin core inlet passage proximate a mid-span of the airfoil body.

In addition to one or more of the features described herein, the plurality of second skin core passages become progressively closer to the suction side as the plurality of second skin core passages extend from the mid-span towards the second radial boundary end.

In addition to one or more of the features described herein, the plurality of second skin core passages circumferentially overlap with the plurality of first skin core passages between 30% and 80% of a span of the airfoil body.

In addition to one or more of the features described herein, the airfoil body defines a main body core passage that radially extends from the first radial boundary end towards the second radial boundary end and is disposed proximate the pressure side, such that the second skin core inlet passage is circumferentially disposed between the first skin core inlet passage and the main body core passage.

In addition to one or more of the features described herein, the airfoil body defines a skin core plenum disposed proximate the second radial boundary end.

In addition to one or more of the features described herein, the plurality of first skin core passages are joined together by the skin core plenum.

In addition to one or more of the features described herein, the plurality of first skin core passages and the plurality of second skin core passages are joined together by the skin core plenum.

In one illustrative embodiment, a gas turbine engine is provided. The gas turbine engine includes an airfoil with an airfoil body having a pressure side and a suction side, each radially extending between a first radial boundary end and a second radial boundary end. The airfoil body defines a main body core passage disposed proximate the pressure side and radially extending from the first radial boundary end towards the second radial boundary end, a plurality of first skin core passages disposed proximate the suction side and radially extending towards the second radial boundary end, and a plurality of second skin core passages that radially extend toward the second radial boundary end and circumferentially extend towards the suction side such that the plurality of second skin core passages circumferentially overlap with the plurality of first skin core passages.

In addition to one or more of the features described herein, the plurality of second skin core passages circumferentially overlap with the plurality of first skin core passages between 30% and 80% of a span of the airfoil body.

In addition to one or more of the features described herein, proximate the first radial boundary end, at least one of the main body core passage and a first skin core inlet passage that is connected to the plurality of first skin core passages thermally shields a second skin core inlet passage that is connected to the second skin core passages.

In addition to one or more of the features described herein, the airfoil body defines a first skin core inlet passage and a second skin core inlet passage, each radially extending from the first radial boundary end towards a mid-span of the airfoil body.

In addition to one or more of the features described herein, the second skin core inlet passage is circumferentially disposed between the first skin core inlet passage and the main body core passage.

In addition to one or more of the features described herein, the plurality of first skin core passages extend from and are operatively connected to the first skin core inlet passage and the plurality of second skin core passages extend from and are operatively connected to the second skin core inlet passage.

In addition to one or more of the features described herein, the plurality of second skin core passages become progressively closer to the suction side as the plurality of second skin core passages extend from the mid-span towards the second radial boundary end.

In addition to one or more of the features described herein, a protrusion is disposed within at least one of the plurality of first skin core passages and the plurality of second skin core passages.

In addition to one or more of the features described herein, a first skin core passage of the plurality of first skin core passages is axially disposed between a first and second skin core passage of the plurality of second skin core passages proximate the suction side at the second radial boundary end.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
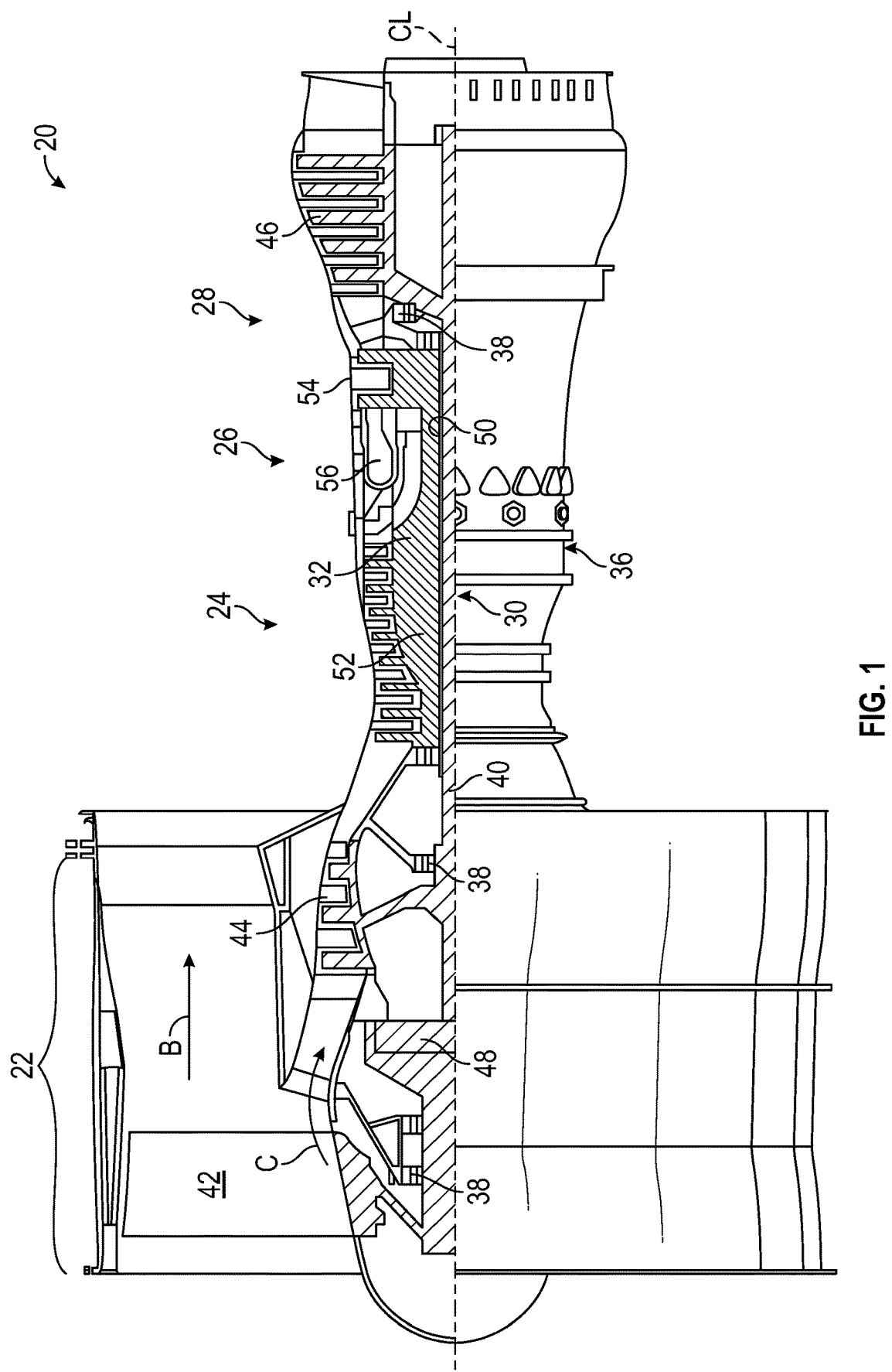
FIG. 1 is a schematic illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis CL relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis CL which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Figure 2:
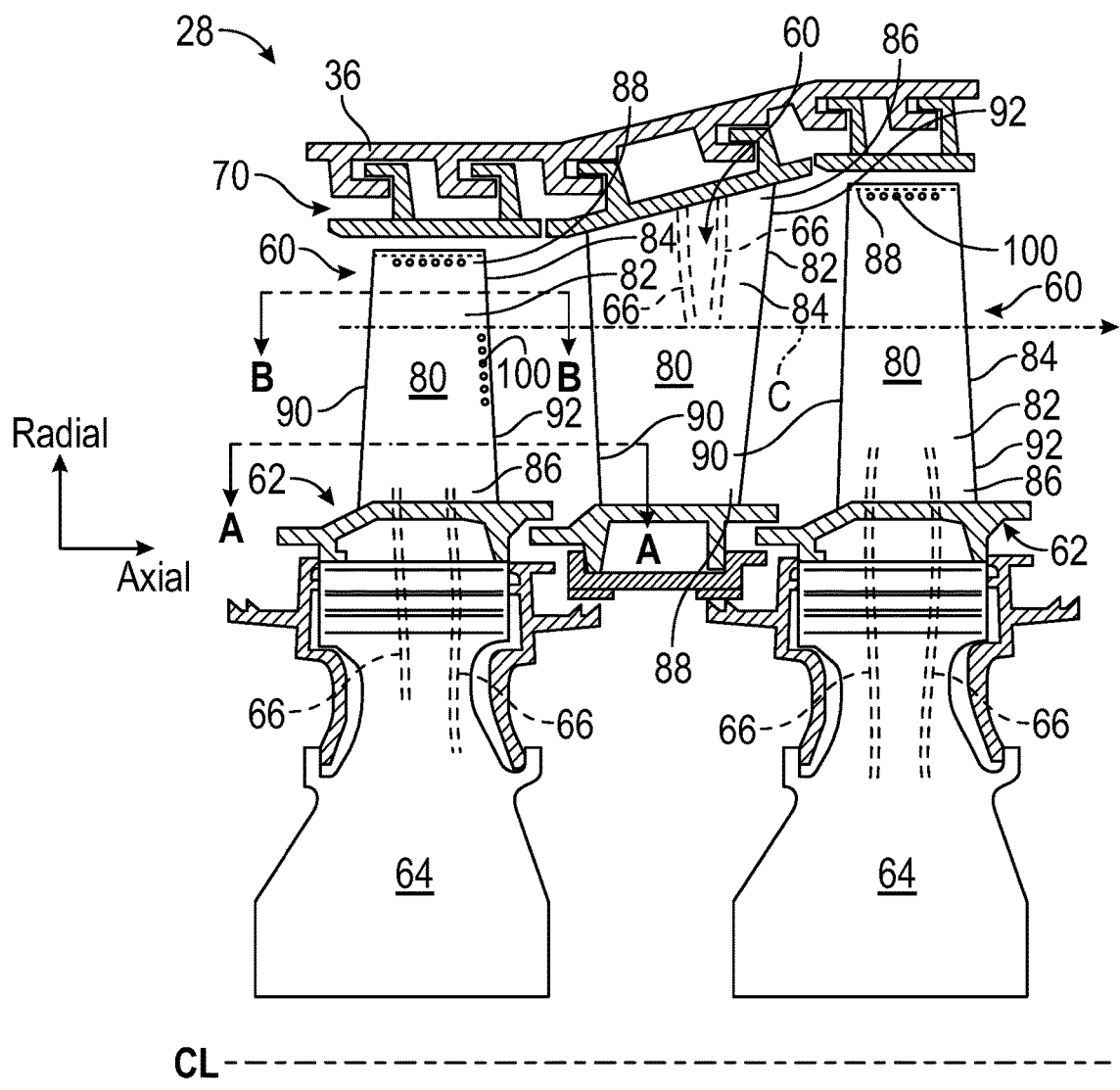
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60 including, for example, one or more blades and vanes. The airfoils 60 may be a blade or vane. The airfoils 60 may be hollow bodies with internal cavities defining a number of channels or cores, hereinafter airfoil cores, formed therein. The airfoil cores may be separated by partitions within the airfoils 60. The partitions may extend for a portion of the length of the airfoil 60, but may stop or end prior to forming a complete wall within the airfoil 60. Thus, each of the airfoil cores may be fluidly connected and form a fluid path within the airfoil 60. The airfoils 60 may include platforms 62. Located below the platforms 62 (e.g., radially inward with respect to the engine longitudinal axis CL) and extending at least partially through a disk 64 from which the airfoils 60 may extend may be airflow ports and/or bleed orifices 66 that enable cooling air to enter the internal cavities of the airfoil 60.

The turbine section 28 is housed within a static engine structure 36 such as a case. In various locations, components, such as seals, may be radially positioned between airfoils 60 and the static engine structure 36. For example, as shown in FIG. 2, blade outer air seals 70 (BOAS) are located radially outboard of the airfoil 60. The BOAS 70 may include supports that are configured to fixedly connect or attach the BOAS 70 to the static engine structure 36.

Each airfoil 60 includes an airfoil body 80 having a pressure side 82, a suction side 84, a first radial boundary end 86, a second radial boundary end 88, a leading edge 90 and a trailing edge 92. The pressure side 82 is disposed opposite or circumferentially spaced apart from the suction side 84. As used herein, the term "circumferential" refers to circumferential with respect to an engine axis (e.g., engine central longitudinal axis CL, shown in FIGS. 1 and 2). The pressure side 82 and the suction side 84 each extend radially from the first radial boundary end 86 toward the second radial boundary end 88. As used herein, the term "radial" refers to radial with respect to the engine central longitudinal axis CL. The pressure side 82 and the suction side 84 each extend generally axially and/or tangentially, with respect to the engine central longitudinal axis CL, between the leading edge 90 and the trailing edge 92. Each of the first radial boundary end 86 and the second radial boundary end 88 extend between the leading edge 90 and the trailing edge 92 opposite each other at opposing ends of the airfoil body 80 in the radial direction. In the case of a vane, the first radial boundary end 86 may be an outer radial end and the second radial boundary end 88 may be an inner radial end. In the case of a blade, the first radial boundary end 86 may be an inner radial end and the second radial boundary end 88 may be an outer radial end.

Figure 3A:
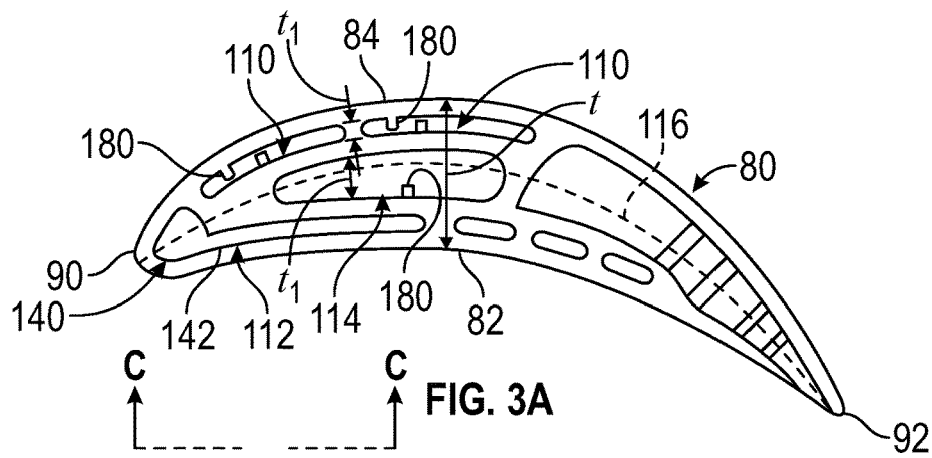
FIG. 3A is a partial cross-sectional view of an airfoil of the gas turbine engine taken along section line A of FIG. 2.
Figure 3B:
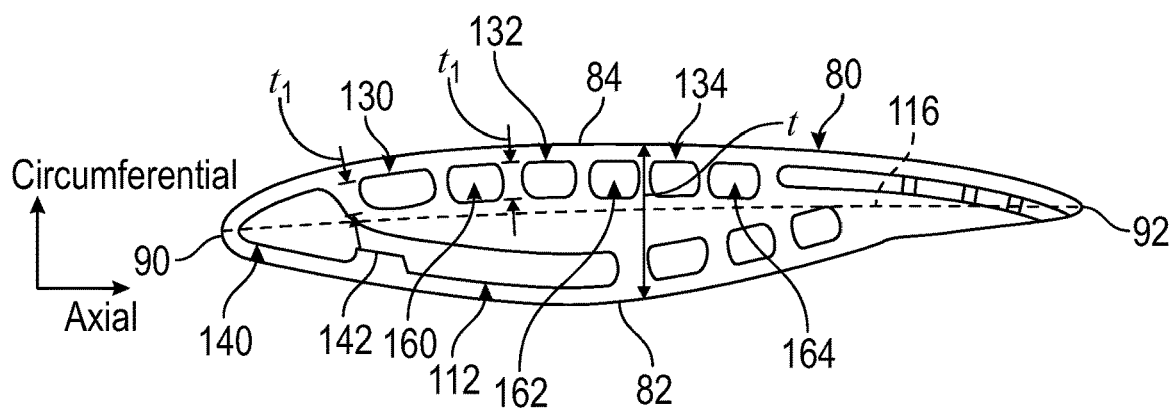
FIG. 3B is a partial cross-sectional view an airfoil of the gas turbine engine taken along section line B of FIG. 2.
Figure 5A:
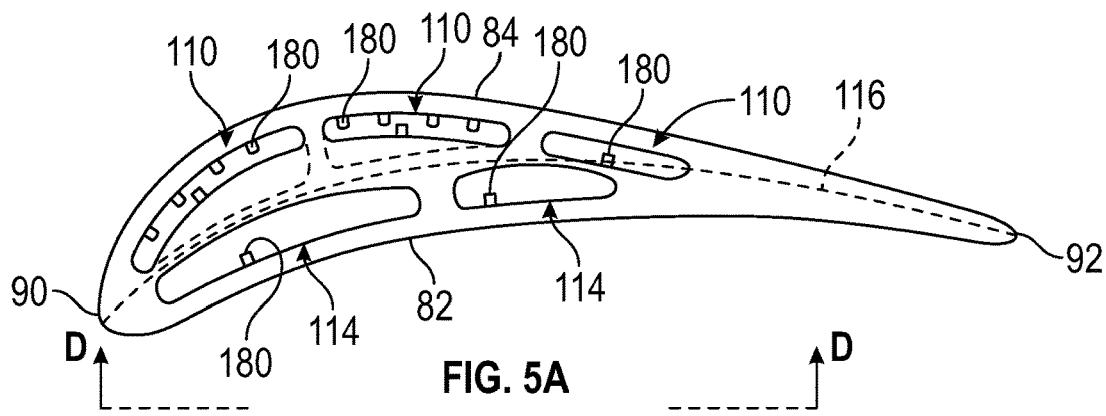
FIG. 5A is a partial cross-sectional view of another airfoil of the gas turbine engine taken along section line A of FIG. 2.
Figure 5B:
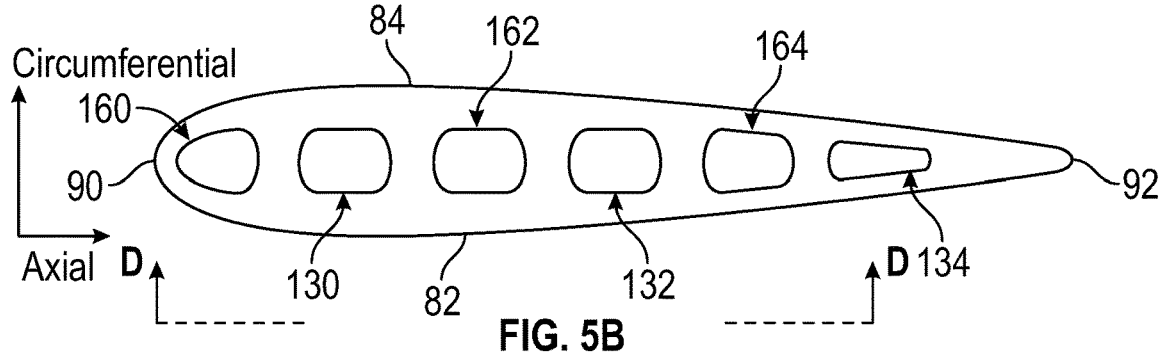
FIG. 5B is a partial cross-sectional view of another airfoil of the gas turbine engine taken along section line B of FIG. 2.

As shown in FIGS. 3B and 5B, the airfoil 60 may be a high lift airfoil having a convex pressure side but may also be an airfoil having a concave pressure side. A high lift airfoil is defined as an airfoil with a Zweifel lift coefficient greater than 1.1. The Zweifel lift coefficient is the ratio of actual airfoil load to ideal airfoil load.

The airfoil body 80 may define a plurality of holes or outlets 100. The plurality of holes or outlets 100 may be defined proximate the trailing edge 92 and be disposed between the first radial boundary end 86 and the second radial boundary end 88. The plurality of holes or outlets 100 may be defined proximate the second radial boundary end 88 and be disposed between the leading edge 90 and the trailing edge 92. The plurality of holes or outlets 100 are fluidly connected to the airflow ports and/or bleed orifices 66.

Figure 4:
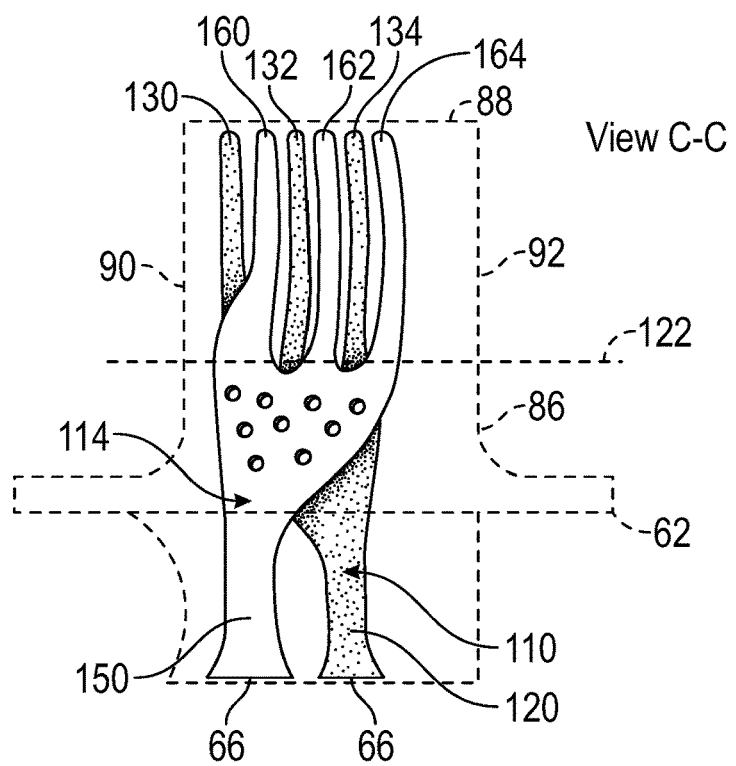
FIG. 4 is a view of the skin core passages of the an airfoil of the gas turbine engine taken along line C-C of FIG. 3A.

Referring to FIGS. 3A, 3B, and 4, the airfoil body 80 defines a plurality of first skin core passages 110, a main body core passage 112, and a plurality of second skin core passages 114. The term skin core passage, as used herein, may refer to an internal passage or core that is axially or circumferentially disposed between a main body core and an external surface of the airfoil 60 (e.g. the pressure side 82, the suction side 84, the leading edge 90, or the trailing edge 92). The term skin core passage, as used herein, may also refer to an internal passage or core that extends primarily in the radial direction.

As shown in FIGS. 3A and 3B, each skin cooling passage (e.g. the plurality of first skin core passages 110 and/or the plurality of second skin core passages 114) may have a thickness, t1, measured normal to mean camber line 116 that is less than about 25% of the total thickness, t, of the airfoil body 80 that is measured normal to the mean camber line 116 of the airfoil 60 at the same location of the mean camber line 116. In at least one embodiment, the closest distance between an external surface and each skin core passage (e.g. the plurality of first skin core passages 110 and/or the plurality of second skin core passages 114) may be between about 5% and 15% of thickness, t. In at least one embodiment, the circumferential distance between each skin core passage may be between about 5% and 15% of thickness, t. In at least one embodiment, the circumferential distance between each skin core passage may be between about 10% and 25% of thickness, t.

The plurality of first skin core passages 110, the main body core passage 112, and the plurality of second skin core passages 114 are fluidly connected to the airflow ports and/or bleed orifices 66. The plurality of first skin core passages 110, the main body core passage 112, and the plurality of second skin core passages 114 are disposed generally perpendicular to the mean camber line 116 of the airfoil 60 and are a series of stacked cooling passages.

The plurality of first skin core passages 110 are disposed proximate the suction side 84. The plurality of first skin core passages 110 radially extend towards the second radial boundary end 88. The plurality of first skin core passages 110 extend from and are operatively connected to a first skin core inlet passage 120, as shown in FIG. 4.

The first skin core inlet passage 120 is disposed proximate the suction side 84 proximate the first radial boundary end 86. The first skin core inlet passage 120 is operatively connected to at least one bleed orifice 66 and radially extends from the first radial boundary end 86 towards a mid-span 122 of the airfoil body 80. The plurality of first skin core passages 110 radially extend from the first skin core inlet passage 120 proximate the mid-span 122 and axially spread apart towards the leading edge 90 and the trailing edge 92.

The plurality of first skin core passages 110, proximate the second radial boundary end 88 as shown in FIG. 3B, includes a first skin core passage 130, a second skin core passage 132, and a third skin core passage 134. The first skin core passage 130 is disposed between the leading edge 90 and the skin core passage 132. The second skin core passage 132 is axially disposed between the leading edge 90 and the trailing edge 92. The third skin core passage 134 is disposed between the trailing edge 92 and the second skin core passage 132, such that the second skin core passage 132 is axially disposed between the first skin core passage 130 and the third skin core passage 134.

The main body core passage 112 is disposed proximate the pressure side 82 proximate the first radial boundary end 86 and the second radial boundary end 88. The main body core passage 112 radially extends from the first radial boundary end 86 towards the second radial boundary end 88. The main body core passage 112 may be connected to a leading edge skin core passage 140 by a passageway 142. The leading edge skin core passage 140 radially extends from the first radial boundary end 86 towards the second radial boundary end 88. The passageway 142 may extend radially from the first radial boundary end 86 towards the second radial boundary end 88 or may intermittently connect the main body core passage 112 and the leading edge skin core passage 140 at a plurality of radial spans.

The plurality of second skin core passages 114 radially extend from and are operatively connected to a second skin core inlet passage 150 towards the second radial boundary end 88, as shown in FIG. 4. The plurality of second skin core passages 114 circumferentially extend towards the suction side 84 such that the plurality of second skin core passages 114 become progressively closer to the suction side 84 proximate the second radial boundary end 88.

The second skin core inlet passage 150 is circumferentially disposed between the first skin core inlet passage 120 and the main body core passage 112, as shown in FIG. 3A. At least one of the main body core passage 112 and the first skin core inlet passage 120 thermally shields the second skin core inlet passage 150 that is connected to the plurality of second skin core passages 114 to thermally shield the cooling air within the second skin core inlet passage 150 and/or the plurality of second skin core passages 114 from picking up heat between the mid span 122 and proximate the first radial boundary end 86. The thermal shielding results in cooler cooling air within the plurality of second skin core passages 114 and may provide more cooling to the airfoil 60 proximate the second radial boundary end 88, to increase durability, increase time on wing, and increase service temperature. The cooler cooling air within the plurality of second skin core passages 114 improves airfoil thermal distribution and improves the cooling capacity radially outboard resulting in cooler second radial boundary ends 88 of the airfoil 60.

The second skin core inlet passage 150 is circumferentially disposed between the first skin core inlet passage 120 and the pressure side 82, as shown in FIG. 5A, should a main body core passage 112 not be provided.

The second skin core inlet passage 150 is operatively connected to at least one bleed orifice 66 and radially extends from the first radial boundary end 86 towards the mid-span 122. The plurality of second skin core passages 114 radially extend from the second skin core inlet passage 150 proximate the mid-span 122 and axially spread apart towards the leading edge 90 and the trailing edge 92.

The plurality of second skin core passages 114 circumferentially overlap with at least a portion of the plurality of first skin core passages 110 as the plurality of second skin core passages 114 radially extend towards the second radial boundary end 88 such that the plurality of first skin core passages 110 and the plurality of second skin core passages 114 are woven such that the mid-span 122 and the second radial boundary end 88 have improved cooling. The plurality of second skin core passages 114 circumferentially overlap with at least a portion of the plurality of first skin core passages 110 between 30% and 80% of a span of the airfoil body 80 of the airfoil 60.

The plurality of second skin core passages 114, proximate the second radial boundary end 88, as shown in FIG. 3B, includes a first skin core passage 160, a second skin core passage 162, and a third skin core passage 164. The first skin core passage 160 is disposed proximate the leading edge 90. The second skin core passage 162 is axially disposed between the leading edge 90 and the trailing edge 92. The third skin core passage 164 is disposed closer to the trailing edge 92 than the first skin core passage 160.

As the plurality of second skin core passages 114 transition towards the second radial boundary end 88, the plurality of second skin core passages 114 become disposed adjacent to the suction side 84 such that the first skin core passage 160 of the plurality of second skin core passages 114 is axially disposed between the first skin core passage 130 and the second skin core passage 132 of the plurality of first skin core passages 110. The second skin core passage 162 of the plurality of second skin core passages 114 is axially disposed between the second skin core passage 132 and the third skin core passage 134 of the plurality of first skin core passages 110.

Referring to FIGS. 5A and 5B, the main body core passage 112 may not be provided. In such a configuration, the plurality of first skin core passages 110 are disposed proximate suction side 84 and radially extend from the first radial boundary end 86, as shown in FIG. 5A, towards the second radial boundary end 88, as shown in FIG. 5B. The plurality of first skin core passages 110 axially spread apart towards the leading edge 90 and the trailing edge 92.

The first skin core passage 130 is disposed between the leading edge 90 and the second skin core passage 132. The second skin core passage 132 is axially disposed between the leading edge 90 and the trailing edge 92. The third skin core passage 134 is disposed between the trailing edge 92 and the second skin core passage 132, such that the second skin core passage 132 is axially disposed between the first skin core passage 130 and the third skin core passage 134.

The plurality of second skin core passages 114 are disposed proximate pressure side 82 and radially extend from the first radial boundary end 86, as shown in FIG. 5A, towards the second radial boundary end 88, as shown in FIG. 5B. The plurality of second skin core passages 114 axially spread apart towards the leading edge 90 and the trailing edge 92.

The first skin core passage 160 is disposed proximate the leading edge 90. The second skin core passage 162 is axially disposed between the leading edge 90 and the trailing edge 92. The third skin core passage 164 is disposed closer to the trailing edge 92 than the second skin core passage 162.

As the plurality of second skin core passages 114 transition towards the second radial boundary end 88, the plurality of second skin core passages 114 move progressively closer to the suction side 84 such that the first skin core passage 130 of the plurality of first skin core passages 110 is axially disposed between the first skin core passage 160 and the second skin core passage 162 of the plurality of second skin core passages 114. The second skin core passage 132 of the plurality of first skin core passages 110 is axially disposed between the second skin core passage 162 and the third skin core passage 164 of the plurality of second skin core passages 114.

Figures 6, 7:
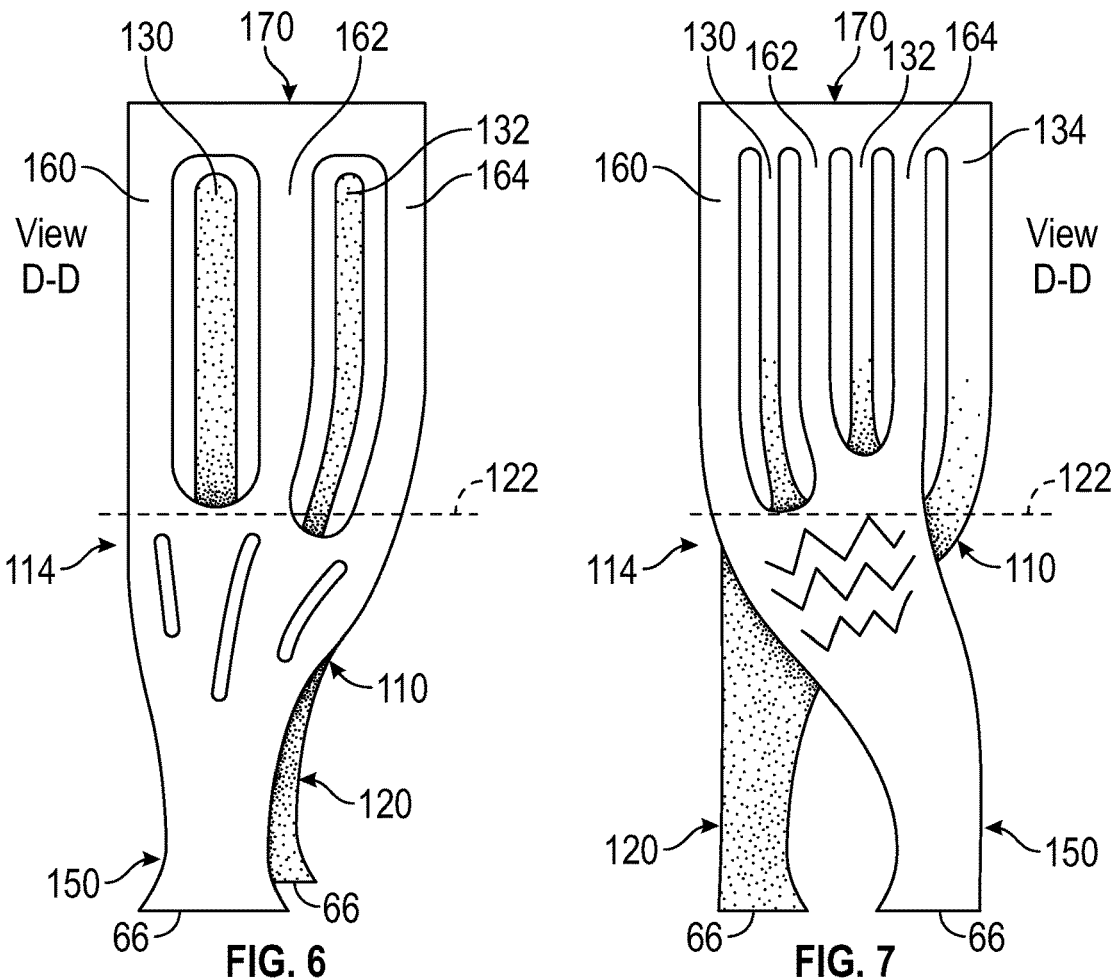
FIG. 6 is a side view of a skin passage core assembly taken along line D-D of FIG. 5A.
FIG. 7 is a side view of another skin passage core assembly taken along line D-D of FIG. 5B.

Referring to FIGS. 6 and 7, the airfoil body 80 defines a skin core plenum 170. The skin core plenum 170 is disposed proximate the second radial boundary end 88 and extends between the pressure side 82 the suction side 84, the leading edge 90, and the trailing edge 92. The skin core plenum 170 may be fluidly connected to the plurality of holes or outlets 100.

The plurality of first skin core passages 110 may be joined together by the skin core plenum 170, as shown in FIG. 6. The first skin core passage 130, the second skin core passage 132, and the third skin core passage 134 are each connected to the skin core plenum 170.

The plurality of first skin core passages 110 and the plurality of second skin core passages 114 may be joined together by the skin core plenum 170, as shown in FIG. 7. The first skin core passage 130, the second skin core passage 132, and the third skin core passage 134 of the plurality of first skin core passages 110 and the first skin core passage 160, the second skin core passage 162, and the third skin core passage 164 of the plurality of second skin core passages 114 are each connected to the skin core plenum 170.

At least one protrusion 180 may be disposed within at least one skin core passage of the plurality of first skin core passages 110 and the plurality of second skin core passages 114, as shown in FIGS. 3A and 5A. The at least one protrusion 180 is disposed on the hot side of the core passages, i.e. the side of the core passage that faces the gas path surface of the airfoil. The at least one protrusion 180 may include ridges, or perturbations that may increase the surface area of an interior surface of at least one of the plurality of first skin core passages 110 and the plurality of second skin core passages 114 to enhance heat transfer between the cooling air within a passage in the interior surface.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, comprising:
 an airfoil body having a pressure side and a suction side that are circumferentially spaced apart from each other, each radially extending between a first radial boundary end and a second radial boundary end, and each axially extending between a leading edge and a trailing edge, wherein one of the first radial boundary and the second radial boundary is a tip or platform and the other of the first radial boundary and the second radial boundary is spaced apart from the tip or platform,
 the airfoil body defining:
 a plurality of first skin core passages disposed proximate the suction side, the plurality of first skin core passages radially extending from the first radial boundary end towards the second radial boundary end, such that the plurality of first skin core passages are axially spaced apart from each other at the second radial boundary, and
 a plurality of second skin core passages, the plurality of second skin core passages radially extending from the first radial boundary end toward the second radial boundary end and circumferentially extending from a location spaced apart from the suction side towards the suction side,
 wherein the plurality of second skin core passages become progressively circumferentially closer to the suction side proximate the second radial boundary end, and wherein the plurality of second skin core passages are axially spaced apart from each other at the second radial boundary,
 wherein the plurality of second skin core passages and the plurality of first skin core passages are woven so that one of the plurality of first skin core passages is axially disposed between the leading edge and one of the second skin core passages, and the one of the second skin core passages is axially disposed between the leading edge and the trailing edge, and
 wherein the plurality of second skin core passages at least partially circumferentially overlap with the plurality of first skin core passages on the suction side.

2. The airfoil of claim 1, wherein proximate the second radial boundary end, a first skin core passage of the plurality of first skin core passages is at least a partially axially disposed between a first and second skin core passage of the plurality of second skin core passages.

3. The airfoil of claim 1, wherein the airfoil body defines a first skin core inlet passage that is disposed proximate the first radial boundary end and the suction side and the plurality of first skin core passages extend from the first skin core inlet passage.

4. The airfoil of claim 3, wherein the airfoil body defines a second skin core inlet passage that is disposed proximate the first radial boundary end and is circumferentially disposed between the first skin core inlet passage and the pressure side.

5. The airfoil of claim 4, wherein the plurality of second skin core passages extend from the second skin core inlet passage proximate a mid-span of the airfoil body.

6. The airfoil of claim 5, wherein the plurality of second skin core passages become progressively closer to the suction side as the plurality of second skin core passages extend from the mid-span towards the second radial boundary end.

7. The airfoil of claim 5, wherein the plurality of second skin core passages circumferentially overlap with the plurality of first skin core passages between 30% and 80% of a span of the airfoil body.

8. The airfoil of claim 5, wherein the airfoil body defines a main body core passage that radially extends from the first radial boundary end towards the second radial boundary end and is disposed proximate the pressure side, such that the second skin core inlet passage is circumferentially disposed between the first skin core inlet passage and the main body core passage.

9. The airfoil of claim 5, wherein the airfoil body defines a skin core plenum disposed proximate the second radial boundary end.

10. The airfoil of claim 9, wherein the plurality of first skin core passages are joined together by the skin core plenum.

11. The airfoil of claim 9, wherein the plurality of first skin core passages and the plurality of second skin core passages are joined together by the skin core plenum.

12. A gas turbine engine, comprising:
an airfoil with an airfoil body having a pressure side and a suction side that are circumferentially spaced apart from each other, each radially extending between a first radial boundary end and a second radial boundary end, and each axially extending between a leading edge and a trailing edge, wherein one of the first radial boundary and the second radial boundary is a tip or platform and the other of the first radial boundary and the second radial boundary is spaced apart from the tip or platform, the airfoil body defining:
a main body core passage disposed proximate the pressure side and radially extending from the first radial boundary end towards the second radial boundary end,
a plurality of first skin core passages disposed proximate the suction side and radially extending from the first radial boundary end towards the second radial boundary end, such that the plurality of first skin core passages are axially spaced apart from each other at the second radial boundary, and
a plurality of second skin core passages, the plurality of second skin core passages radially extending from the first radial boundary end toward the second radial boundary end and circumferentially extending from a location spaced apart from the suction side towards the suction side,
wherein the plurality of second skin core passages become progressively circumferentially closer to the suction side proximate the second radial boundary end, and wherein the plurality of second skin core passages are axially spaced apart from each other at the second radial boundary,
wherein the plurality of second skin core passages and the plurality of first skin core passages are woven so that one of the plurality of first skin core passages is axially disposed between the leading edge and one of the second skin core passages, and the one of the second skin core passages is axially disposed between the leading edge and the trailing edge, and
wherein the plurality of second skin core passages at least partially circumferentially overlap with the plurality of first skin core passages.

13. The gas turbine engine of claim 12, wherein the plurality of second skin core passages circumferentially overlap with the plurality of first skin core passages between 30% and 80% of a span of the airfoil body.

14. The gas turbine engine of claim 12, wherein proximate the first radial boundary end, at least one of the main body core passage and a first skin core inlet passage that is connected to the plurality of first skin core passages thermally shields a second skin core inlet passage that is connected to the second skin core passages.

15. The gas turbine engine of claim 12, wherein the airfoil body defines a first skin core inlet passage and a second skin core inlet passage, each radially extending from the first radial boundary end towards a mid-span of the airfoil body.

16. The gas turbine engine of claim 15, wherein the second skin core inlet passage is circumferentially disposed between the first skin core inlet passage and the main body core passage.

17. The gas turbine engine of claim 15, wherein the plurality of first skin core passages extend from and are operatively connected to the first skin core inlet passage and the plurality of second skin core passages extend from and are operatively connected to the second skin core inlet passage.

18. The gas turbine engine of claim 17, wherein the plurality of second skin core passages become progressively closer to the suction side as the plurality of second skin core passages extend from the mid-span towards the second radial boundary end.

19. The gas turbine engine of claim 17, wherein a protrusion is disposed within at least one of the plurality of first skin core passages and the plurality of second skin core passages.

20. The gas turbine engine of claim 17, wherein a first skin core passage of the plurality of first skin core passages is at least partially axially disposed between a first and second skin core passage of the plurality of second skin core passages proximate the suction side at the second radial boundary end.

* * * * *